(12) United States Patent
Koschinat

(10) Patent No.: US 6,612,656 B2
(45) Date of Patent: Sep. 2, 2003

(54) WHEEL MOUNTING APPARATUS

(75) Inventor: B. Hubert Koschinat, Hösbach (DE)

(73) Assignee: Otto Sauer Achsenfabrik Keilberg, Bassenbech-Keilberg (DE)

( * ) Notice: Subject to any disclaimer, the term of this patent is extended or adjusted under 35 U.S.C. 154(b) by 0 days.

(21) Appl. No.: 09/803,919

(22) Filed: Mar. 13, 2001

(65) Prior Publication Data

US 2001/0052725 A1 Dec. 20, 2001

(30) Foreign Application Priority Data

Jun. 8, 2000 (DE) .......................... 100 27 942

(51) Int. Cl.[7] .......................... B60B 19/10; B60B 37/00; F16D 65/78
(52) U.S. Cl. .................. 301/6.3; 301/6.8; 188/264 A
(58) Field of Search ................ 301/6.1, 6.3 I, 301/6.8, 6.91, 105.1, 10.1, 11.1, 64.307, 63.101; 188/264 R, 264 A, 264 AA, 264 W

(56) References Cited

U.S. PATENT DOCUMENTS

| | | | | |
|---|---|---|---|---|
| 3,952,820 A | * | 4/1976 | Asberg | 188/18 A |
| 4,503,944 A | * | 3/1985 | Burckhardt et al. | 188/218 A |
| 4,620,616 A | * | 11/1986 | Martin | 188/218 A |
| 5,366,046 A | * | 11/1994 | Klaue | 188/264 A |
| 5,538,114 A | * | 7/1996 | White et al. | 188/218 R |
| 6,095,617 A | * | 8/2000 | Bertetti | 301/6.8 |

FOREIGN PATENT DOCUMENTS

| | | | |
|---|---|---|---|
| DE | 3025731 A1 | 2/1982 | |
| DE | 3025757 A1 | 2/1982 | |
| DE | 46489 A2 | * 3/1982 | 301/6.3 |
| DE | 3942651 C1 | 7/1991 | |
| DE | 4114776 A1 | 11/1992 | |
| DE | 19600656 A1 | 7/1997 | |
| DE | 197 04 353 | 9/1997 | |

* cited by examiner

*Primary Examiner*—S. Joseph Morano
*Assistant Examiner*—Jason R. Bellinger
(74) *Attorney, Agent, or Firm*—Wenderoth, Lind & Ponack, L.L.P.

(57) ABSTRACT

A wheel mounting apparatus includes a wheel hub flange having a wheel mounting portion to be connected to a wheel, and having a hub mounting portion to be connected to a wheel hub. Alternatively, the wheel mounting portion and the wheel hub can be formed as an integral unit, and the hub mounting portion can be eliminated. Ventilation passages are provided between the wheel mounting portion of the wheel hub flange and the hub mounting portion or the wheel hub. Thus, good ventilation and cooling of the brake assembly, which is provided between the wheel rim and the wheel hub, can be achieved.

32 Claims, 3 Drawing Sheets

WHEEL MOUNTING APPARATUS

BACKGROUND OF THE INVENTION

The present invention relates to a wheel mounting apparatus for connecting a wheel including a wheel rim and a wheel disk to a vehicle axle. In particular, the present invention relates to a wheel mounting apparatus having a peripheral wheel mounting portion to be connected to the wheel, and having a hub mounting portion to be connected to a wheel hub, wherein the wheel mounting apparatus has a greater diameter than the wheel hub. Furthermore, the invention relates to a wheel mounting apparatus including such a wheel mounting apparatus integrally connected to a wheel hub.

The available free space under a wheel rim, regardless of the type of brake (drum or disk) used in the car, is used for dimensioning the wheel brake. Due to increased safety reserves for disk brakes of more recent design and, particular, those for use in the high temperature ranges, full utilization of the free space under a wheel rim for a 22.5 inch tire is not absolutely required. This is because, without sacrificing safety, it is possible to use smaller disk brake sizes over which a wheel rim for a 19.5 inch tire will also fit.

In order to cool the brake with air circulation, ventilation holes are commonly provided in the wheel disk between the wheel mounting portion and the wheel rim to allow air flow into the free space under the wheel rim. This type of cooling method for the brakes is necessary because high temperatures, particularly those on the inner wheel rim bead, could cause thermal damage to the tire in the area of the tire bead. In addition, wear of the brake linings at higher temperatures is greater than at lower temperatures.

In a wheel mounting portion for 19.5 inch tires on a pitch circle of 275 mm (a customary example), generously dimensioned ventilation holes can be provided without problems in the area of the wheel disk (which is less sharply oblique), because the distance between the wheel rim diameter and the pitch circle is sufficiently large for the wheel mounting portion. Therefore, ventilation problems are minimized for this design.

However, for a 19.5 inch tire with a wheel mounting portion on a pitch circle of 335 mm (which is customary for 22 inch wheels), there are difficulties in accommodating the ventilation holes in the wheel disk. Due to the size of the pitch circle, only relatively small ventilation holes can be provided in the oblique region of the wheel disk which, due to their oblique position, are further reduced in effectiveness. Thus, in wheel mounting combinations having small wheel rim diameters and large pitch circles, the relatively small radial spacing between the wheel rim and pitch circle creates ventilation problems.

SUMMARY OF THE INVENTION

Therefore, one object of the present invention is to provide a wheel mounting apparatus which allows improved ventilation of the brakes regardless of the wheel rim size and the diameter of the pitch circle. For example, the wheel mounting apparatus of the present invention provides improved ventilation for a standard pitch circle diameter for a wheel mounting of 335 mm. The object of the present invention is achieved by providing a wheel mounting apparatus similar to the general type described above, in which ventilation passages are formed between the wheel mounting portion and the flange mounting portion.

Although the areas of the wheel mounting portion of the wheel mounting apparatuses are especially subject to stress, it was found that when satisfactory stability of the wheel mounting apparatus is maintained, it is possible to provide ventilation passages through which, even when there is a small space between the wheel mounting portion and the wheel rim, a sufficient quantity of air can flow under the wheel rim. Thus, the heat generated during braking can be effectively dissipated. Due to the location of the ventilation passages in the region between the wheel mounting portion and the hub mounting portion, the cooling air can flow into the wheel mounting apparatus better than through ventilation holes that are disposed in an already oblique region of the wheel disk, because these holes are partially covered by the outer wheel rim bead of the wheel rim.

Therefore, due to the arrangement of the present invention, a substantially improved heat dissipation from the brake is achieved. Moreover, even for smaller 19.5 inch wheels, a wheel mounting portion having a larger pitch circle (for example, 335 mm) can be used. Thus, the wheel mounting apparatus can be universally used for different brakes for 19.5 inch and 22.5 inch wheels (wheel rims). This allows a reduction in the fabrication costs, and a reduction in the requirement of fabricating multiple parts.

The ventilation passages, openings, or recesses in the periphery of the wheel mounting apparatus of the present invention also simplify the casting process during production, because the molding sand for setting up the casting mold can be injected better.

The cooling effect on the brakes can be further augmented by providing ventilation holes in the wheel disk. In addition, further cost savings and cooling effect can be achieved by providing ventilation passages so that only spoke-shaped connection webs remain between the ventilation passages. These connection webs can be developed so that they are oblique and/or they are in the form of arcs in order to direct air towards the brake to achieve an improved ventilator effect. For an optimum ventilator effect, the connection webs can be formed so that their outer edges are oblique with respect to a rotation direction of the wheel. In other words, the outer sides of the connection webs extend or project in a direction of rotation of the wheel as the vehicle moves forward.

According to a further embodiment of the wheel mounting apparatus of the present invention, the ventilation passages can be developed as radial opening or as oblong holes having major axes which are arranged in the circumferential direction of the wheel mounting apparatus.

In order to achieve a uniform cooling effect, the ventilation passages may be distributed uniformly on the surface of the wheel mounting apparatus. For example, the ventilation passages may be arranged on one or several pitch circles.

In one embodiment of the wheel mounting apparatus of the present invention, the wheel mounting portion and the flange mounting portion are located in different vertical planes and are connected to one another by an oblique connection section. In this embodiment, the ventilation passages are located in the oblique connection section. Thus, if the wheel mounting portion projects axially outward (with respect to the vehicle axial) relative to the hub mounting portion, a particularly simple connection between the wheel and the wheel mounting apparatus is possible.

Through-holes for receiving wheel bolts are preferably used in order to mount the wheel mounting apparatus onto a wheel. In order to achieve further weight savings and a further simplification of the casting process, additional ventilation holes can be provided near the outer periphery of the wheel mounting apparatus. For example, radially-arranged oblong holes or recesses can be provided near and/or between the through-holes.

To prevent turning of the wheel bolts that connect the wheel mounting apparatus to the wheel, the bolt head of the wheel bolt can preferably have a flattened portion which is braced against a collar on the wheel mounting apparatus. This collar also widens the wheel mounting apparatus and, therefore, improves rigidity and strength of the wheel mounting apparatus.

The through-holes for the wheel bolts may also have, at least on one side, an oblique edge (i.e., rounded-off or chamfered, but not square). This oblique edge of the through-holes prevents "technical notches" which reduce the operational strength of the wheel mounting apparatus by creating an increased stress point, but the oblique edges do not decrease the rigidity of the wheel mounting apparatus.

In one embodiment of the present invention, a brake disk can be mounted to the wheel mounting apparatus by the bolts which connect the hub mounting portion of the wheel mounting apparatus to the wheel hub. In this first embodiment, the wheel hub is provided as a separate structural component, preferably as a cast metal portion, and is connected to the hub mounting portion.

In a second embodiment of the present invention, the wheel mounting apparatus includes a wheel hub in the area of the hub mounting portion of the first embodiment. The wheel hub in this embodiment is integrally connected to the wheel mounting portion. Thus, the wheel mounting apparatus does not include a hub mounting portion. In other words, the wheel mounting portion is integrally connected to the wheel hub (i.e., not mechanically fastened by bolts). In this case, the ventilation passages in the wheel mounting portion provide additional benefits during the casting (production) process for the wheel mounting apparatus. Specifically, molding sand can be injected at a very high velocity and can pass through the ventilation passages in order to set up the mold for the brake disk which is to be cast in a compound casting. For this purpose, the integral and precast wheel hub and wheel mounting portion is jointly placed into the second mold. The same casting technological advantage is also provided by additional through-holes or recesses in the periphery of the wheel mounting apparatus. In a preferred arrangement of this embodiment, a brake disk is developed as a compound cast part, and formed integrally with the wheel hub and axially spaced apart from the wheel mounting portion.

BRIEF DESCRIPTION OF THE DRAWINGS

Further advantages, characteristics, and applications of the present invention will become evident in the following description made with reference to specific examples and the following drawings.

DETAILED DESCRIPTION OF THE INVENTION

Figure 1:
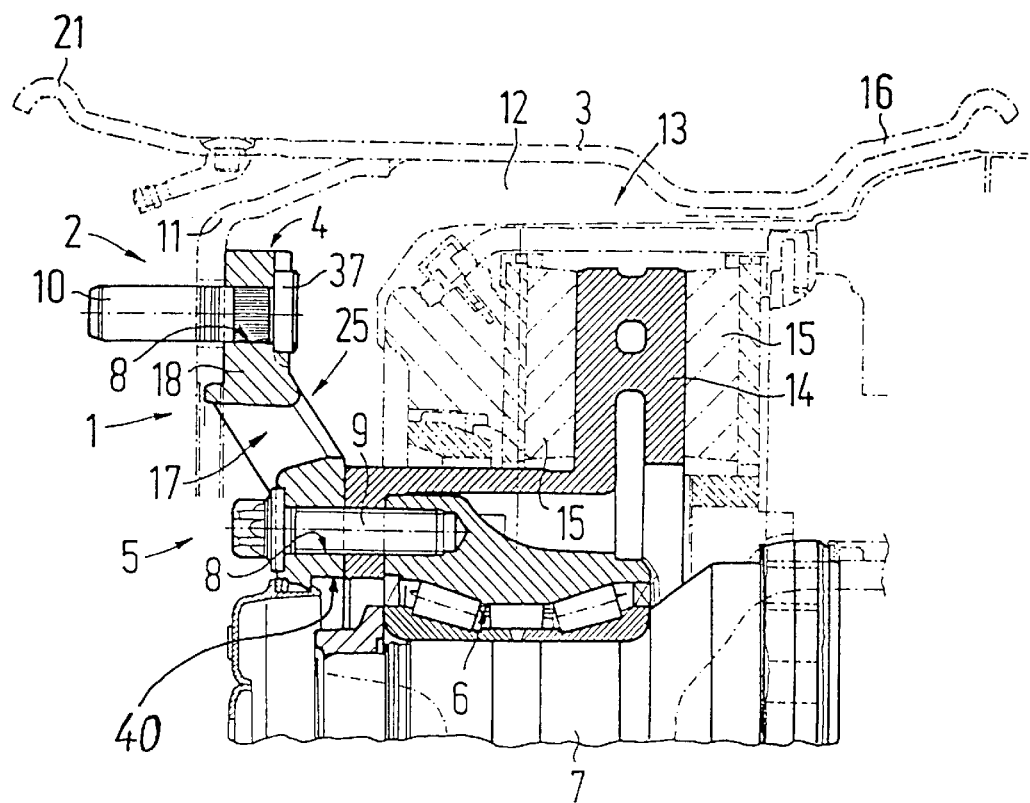
FIG. 1 is a cross sectional view through the upper half of a wheel mounting apparatus according to a first embodiment of the present invention, in which a hub mounting portion is connected to a wheel hub and a wheel mounting portion is connected to a wheel.

A first embodiment of the present invention is shown in FIG. 1, in which the wheel mounting apparatus of the present invention comprises a wheel hub flange 1 including a wheel mounting portion 2 near the outer periphery 4 of the wheel hub flange 1, and a hub mounting portion 5. The wheel mounting portion 2 is provided for connecting the wheel mounting apparatus to a wheel including a wheel rim 3 and a wheel disk 11, and the hub mounting portion 5 is provided for connecting the wheel mounting apparatus to a wheel hub 6. The wheel hub flange 1 has a greater diameter than the wheel hub 6, which is connected to the outer end of an axle beam 7. The hub mounting portion 5 of the wheel hub flange 1 also includes through-holes 8 near the inner periphery 40 of the wheel hub flange 1. Bolts 9 can be inserted through the through-holes 8 so as to connect the wheel hub flange 1 to the wheel hub 6.

As shown in FIG. 1, the wheel mounting portion 2 is provided in a first geometric plane that is axially offset (with respect to axle beam 7) in an outward direction relative to the hub mounting portion 5, which is provided in a second geometric plane. Through-holes 8 are also provided in the wheel mounting portion 2 of the wheel hub flange 1, and wheel bolts 10 can be inserted through the though-holes 8 so as to mount the wheel disk 11 of the wheel to the wheel mounting apparatus 1.

As shown in FIG. 1, the wheel rim 3 of the wheel extends in a substantially parallel manner to the axle beam 7 so as to form a space 12 between the wheel hub 6 and the wheel rim 3. A brake caliper 13, including a brake disk 14 and two brake pads 15 which engage both sides of the brake disk 14, is arranged within the space 12, and the brake disk 14 is connected between the hub mounting portion 5 and the wheel hub 6 by bolt 9. Near the inner wheel rim beads 16, the space 12 between the wheel rim 3 and the brake caliper 13 is very small. Therefore, the heat generated during a braking operation will accumulate in the space 12.

In order to dissipate the hot air accumulating in the space 12 and, therefore, in order to cool the brake, an oblique connection portion 18 of the wheel hub flange 1 which connects the wheel mounting portion 2 and the hub mounting portion 5 includes ventilation passages 17. Air flows through these ventilation passages 17 into the space 12 in order to cool the brake caliper 13. The ventilation passages 17 are arranged in the oblique connection portion 18 so that cooling air that flows in though the ventilation passages 17 will pass by the entire brake disk 14 of the brake caliper 13, and then be exhausted through the smaller portion of the space 12 between the inner wheel rim bead 16 and the brake caliper 13. Thus, a particularly effective cooling of the brake disk 14 is achieved because fresh air is continuously supplied through the ventilation passages 17. Consequently, despite the relatively small size of space 12, reliable cooling of the brake caliper 13 including the brake disk 14 can be insured. Due to the air current, the inner wheel rim bead 16 is also sufficiently cooled so that no danger exists of damaging the tire in the area of the inner wheel rim bead 16 due to an excessively high wheel rim bead temperature.

Figure 2:
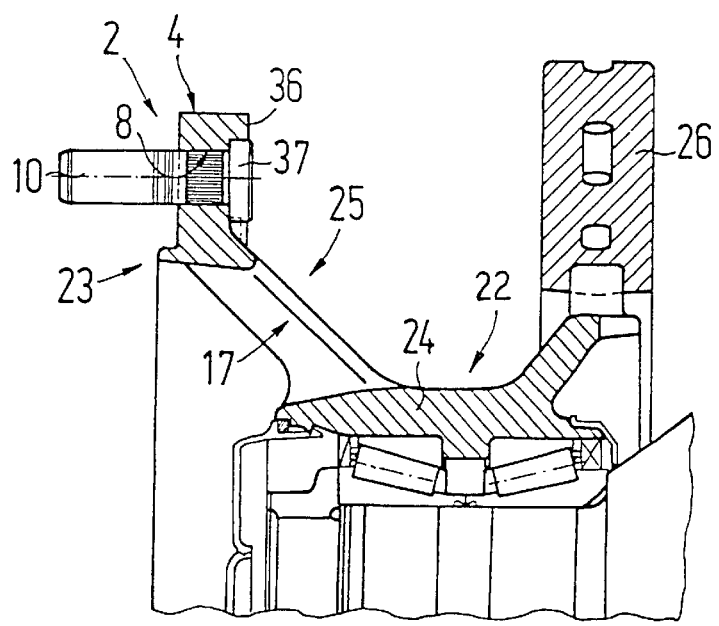
FIG. 2 is a cross sectional view through the upper half of a wheel mounting apparatus according to a second embodiment of the present invention.

A second embodiment of the present invention is shown in FIG. 2. In the description of this embodiment, several parts are the same as those described with respect to the first embodiment, and the same part numbers in those cases will be used in the following description. In this embodiment, the wheel hub flange 23 includes a wheel mounting portion 2 that is integrally connected to a wheel hub 22 so that the hub mounting portion of the first embodiment is not necessary. The wheel hub 22 includes a wheel hub body 24 which is connected to the wheel mounting portion of the wheel hub flange 23 by oblique connection portion 25. The wheel hub flange 23 and the wheel hub 22 are preferably an integral cast metal part. The ventilation passages 17 are arranged in the oblique connection portion 25 between the wheel mounting portion 2, which projects outwardly in an axial direction with respect to the axle beam 7, and the wheel hub body 24. On the side of the wheel hub flange 23 opposite the wheel mounting portion (i.e., the inner side), a brake disk 26 is provided. In contrast to the first embodiment, the brake disk 26 of the second embodiment is fixed on the inner end of the wheel hub body 24 by, for example, a compound casting process. In this case, for example, the precast and integral structure including the wheel hub 22 and wheel mounting portion 2 is placed into a second casting mold to form the brake disk 26. In order to produce this second casting mold, molding sand is shot at a high velocity around the already precast and integral wheel hub 22 and wheel mounting portion 2. In this case, the ventilation passages 17 have the added advantage that the molding sand which is blown at a high velocity can pass through the ventilation passages 17 so that the molding sand is distributed in an optimal manner and so that no voids are generated while forming the second casting mold.

Figure 3:
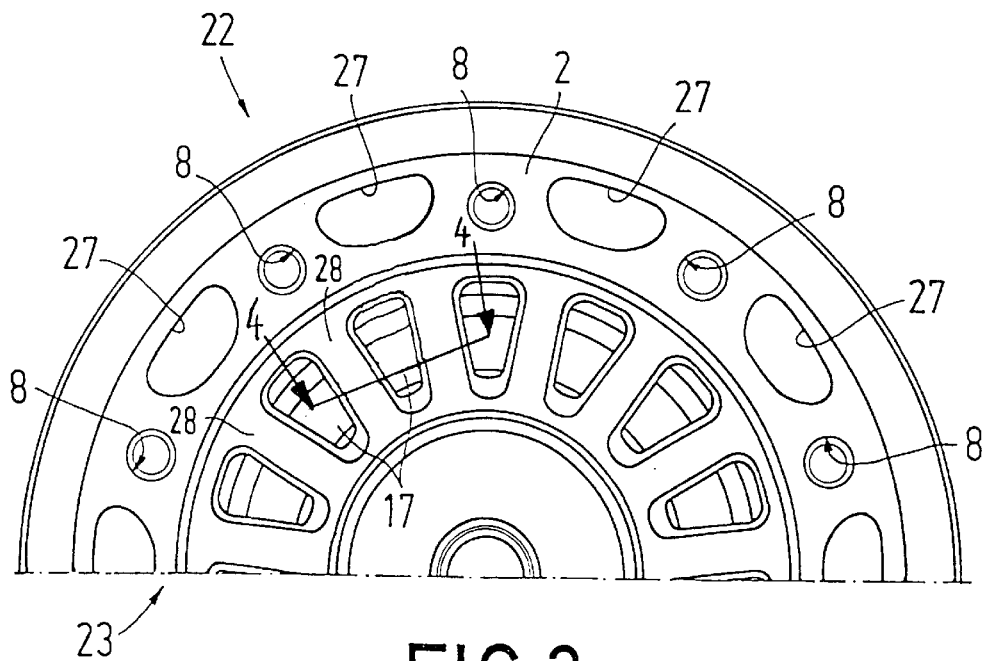
FIG. 3 is a side view of the upper half of the wheel mounting apparatus of the present invention.

As shown in FIG. 3, in addition to the first group of ventilation passages 17, the wheel mounting portion 2 of either the first or second embodiment of the present invention can include a second group of ventilation passages, such as oblong holes 27. These oblong holes 27 have major axes that extend in a substantially circumferential direction of the wheel mounting portion 2, and they are located between the through-holes 8 which receive the wheel bolts 10. Molding sand can also be injected through these oblong holes 27 so that the production of the second casting mold for the formation of the brake disk 26 can be facilitated. Furthermore, the additional oblong holes 27 contribute to an advantageous weight decrease.

The oblong holes 27 are uniformly arranged (i.e., evenly distributed) on a pitch circle on the wheel mounting portion 2 of the wheel mounting portion 2. Likewise, the ventilation passages 17 formed in either of the connection portions 18, 25 between the wheel mounting portion 2 and the hub mounting portion 5 or the wheel hub body 24 are also uniformly arranged on a pitch circle on the wheel hub flange 1, 23. These ventilation passages 17 are formed so that only connection webs 28 remain between the discrete ventilation passages 17 so that the wheel hub flange 1, 23 has an attractive outer design.

Figure 4:
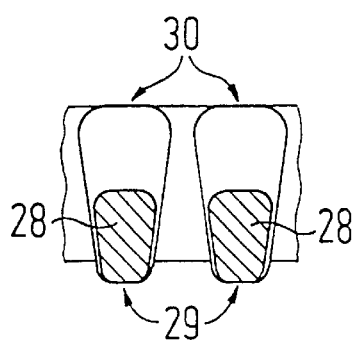
FIG. 4 is a cross sectional view through line 4—4 of FIG. 3 showing connection webs in the wheel mounting portion of the present invention.

FIG. 4 shows two connection webs 28 taken along section 4—4 of FIG. 3. These two connection webs 28 have substantially rectangular cross sections with rounded-off edges, in which the outer side 29 (with respect to an axial direction of the wheel mounting apparatus) has a smaller thickness (i.e., is narrower) than the inner side 30. Although FIG. 4 shows one example of a cross section for the connection webs 28, other cross sectional forms, such as oval cross sectional shapes, can also be used.

Figure 5:
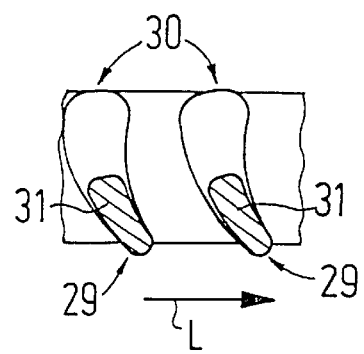
FIG. 5 is a cross sectional view of an alternate arrangement of the connection webs shown in FIG. 4.

FIG. 5 shows a possible modification of the connection web shown in FIG. 4 and FIG. 3. In particular, the connection webs 31 of FIG. 5 have an arc-shaped cross section, and they are obliquely turned at the outer side 29 toward the direction of rotation L of the wheel (i.e., toward the forward end of the vehicle). With this configuration, an enhanced ventilator effect can be generated which further augments the cooling effect of the air flowing into the space 12. The connection webs 28, 31 described with respect to FIGS. 4 and 5 can be applied to the wheel hub flange 1 of the first embodiment shown in FIG. 1, or to the wheel hub flange 23 of the second embodiment.

Figure 6:
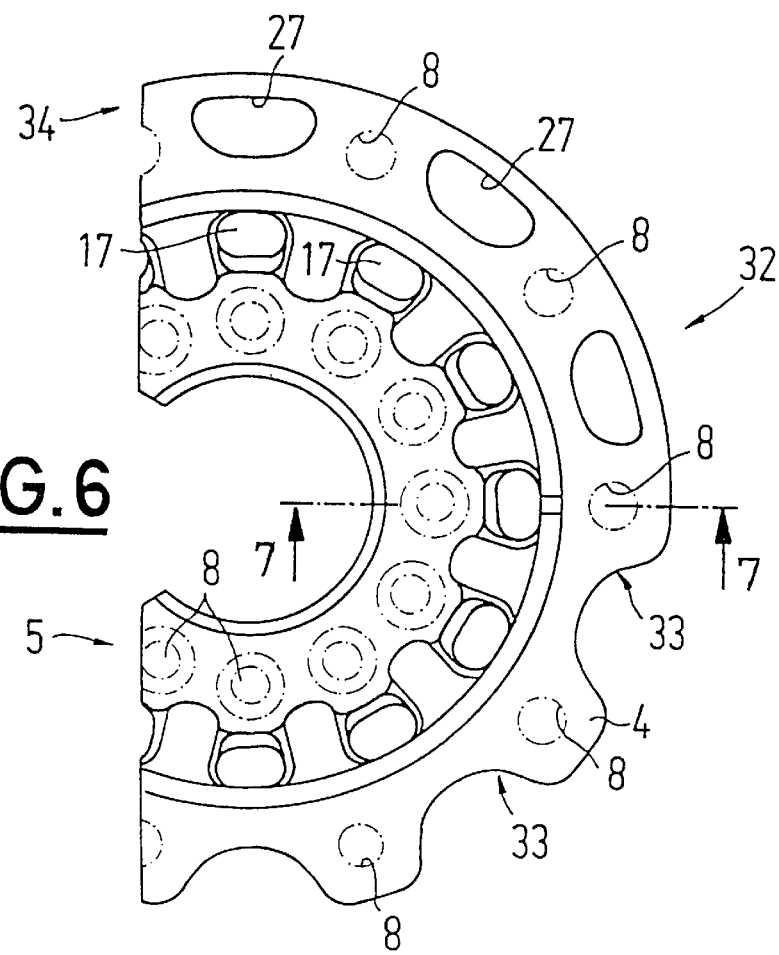
FIG. 6 is a partial side view of a third embodiment of the wheel mounting apparatus of the present invention, in which line 7—7 divides this figure into an upper half showing one alternate arrangement of the third embodiment, and a lower half showing a second alternate arrangement of the third embodiment.

FIG. 6 shows a wheel hub flange 32 of a third embodiment of the present invention. It is to be noted that the features of the third embodiment can be used in combination with any of the features of the first or second embodiment. FIG. 6 is divided into halves by line 7—7, and the upper half of FIG. 6 shows one arrangement of the third embodiment, while the lower half shows a second arrangement of the third embodiment. In both arrangements of the third embodiment, the ventilation holes 17 are formed as oblong holes having major axes arranged in a substantially transverse direction with respect to the radial direction of the wheel mounting apparatus 32. The wheel hub flange 32 of the third embodiment includes a wheel mounting portion 34 having two possible arrangements as shown in FIG. 6. In a first arrangement of the third embodiment shown in the upper half of FIG. 6, oblong holes 27 are uniformly arranged between the through-holes 8 which receive the wheel bolts 10. In the second arrangement of the third embodiment shown in the lower half of FIG. 6, recesses 33 in the circumferential surface (i.e., the peripheral surface) of the wheel mounting portion 34 are provided between the through-holes 8 which receive the bolts 10. In this case, molding sand for forming the casting mold can be injected through these recesses 33.

Figure 7:
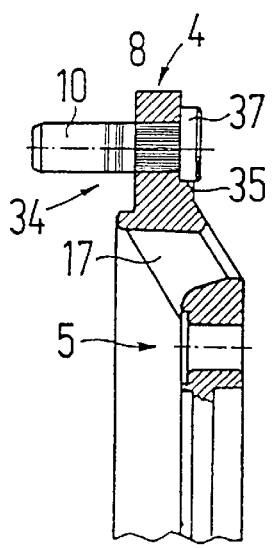
FIG. 7 is a sectional view of the wheel mounting apparatus according to the present invention taken through line 7—7 in FIG. 6 showing a first bolting arrangement.
Figure 8:
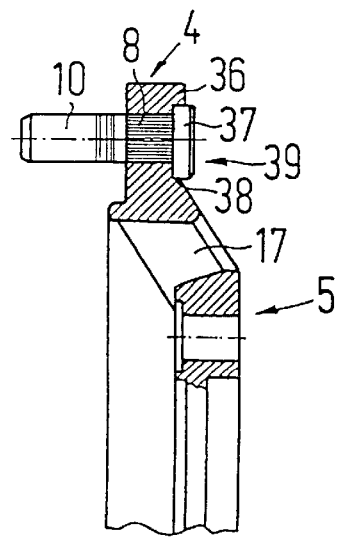
FIG. 8 is a sectional view similar to FIG. 7 showing a second bolting arrangement of the present invention.

FIGS. 7 and 8 show two alternate arrangements for the configuration of the wheel bolts 10 used in the wheel hub flange 32 of the third embodiment. As shown in FIG. 7, the wheel bolt 10 includes a bolt head 37 which has a flat portion that contacts an inner projection 35 of the wheel mounting portion 34. Thus, the flattened portion of bolt head 37 which contacts the inner projection 35 of wheel mounting portion 34 prevents the wheel bolt 10 from inadvertently turning so that the wheel bolt 10 remains securely fastened.

In an alternate arrangement shown in FIG. 8, the bolt head 37 of wheel bolt 10 has a flattened portion which contacts a collar 36 near the outer periphery 4 of the wheel hub flange 32. The contact between the flattened portion of the bolt head 37 and the collar 36 prevents the wheel bolt 10 from inadvertently rotating so that the wheel bolt 10 is securely held. In addition, the collar 36 widens the wheel mounting portion 34 of the wheel hub flange 32 so that the wheel hub flange 32 becomes stronger and more rigid. On a circumference of the through-holes 8 near the collar 36, an oblique edge 38 (such as a rounded edge) of the wheel hub flange 32 can be provided. This oblique edge eliminates sharp-edged corners which would reduce strength due to the creation of a stress point during loading, at which cracks frequently occur.

The ventilation passages 17 provided in the wheel hub flanges 1, 23 and 32 of the first through third embodiments are equally successful for 19.5 inch and 22.5 inch wheels so that effective cooling of the brake caliper 13 including the disk brake 14 disposed under the wheel rim 3 can be achieved. In addition, the wheel mounting apparatuses of the present invention also provide a high stability.

Although the present invention has been described with respect to examples of specific embodiments, these examples are not intended to further limit the attached claims.

I claim:

1. A wheel mounting apparatus comprising:
    a wheel hub flange including:
        a hub mounting portion to be connected to a wheel hub;
        a wheel mounting portion to be connected to a wheel;
        a connecting portion connecting said hub mounting portion and said wheel mounting portion, said connection portion including ventilation passages formed therein; and
        a brake disk mounted to said hub mounting portion.

2. The wheel mounting apparatus of claim 1, wherein said ventilation passages are formed by spoke-shaped connection webs between said ventilation passages and extending in a radial direction of said wheel mounting portion.

3. The wheel mounting apparatus of claim 2, wherein each of said connection webs has a cross-sectional shape having an outer side thickness smaller than an inner side thickness, wherein said inner side and said outer side are defined relative to an axial direction of the wheel mounting apparatus.

4. The wheel mounting apparatus of claim 2, wherein each of said connection webs has an arc-shaped cross-section.

5. The wheel mounting apparatus of claim 4, wherein each of said connection webs has an outer side extending in a direction of rotation of the wheel when a vehicle attached to the wheel is traveling in a forward direction, said outer side being defined relative to an axial direction of the wheel mounting apparatus.

6. The wheel mounting apparatus of claim 1, wherein each of said ventilation passages is formed as an oblong hole having a major axis arranged in a circumferential direction of said wheel mounting portion.

7. The wheel mounting apparatus of claim 1, wherein said ventilation passages are evenly distributed around said wheel mounting portion on at least one pitch circle formed with respect to a center of rotation of said wheel hub flange.

8. The wheel mounting apparatus of claim 1, wherein said wheel mounting portion is provided in a first geometric plane, and said hub mounting portion is provided in a second geometric plane, said first plane being offset from said second plane with respect to an axial direction of the wheel mounting apparatus, said connecting portion of said wheel hub flange comprising an oblique connecting portion.

9. The wheel mounting apparatus of claim 1, wherein said ventilation passages in said connecting portion of said wheel hub flange comprise a first group of ventilation passages, said wheel mounting portion including a second group of ventilation passages near an outer periphery of said wheel mounting portion.

10. The wheel mounting apparatus of claim 9, wherein said second group of ventilation passages comprises oblong holes having major axes arranged in a circumferential direction of said wheel mounting portion.

11. The wheel mounting apparatus of claim 9, wherein said second group of ventilation passages comprises recesses in a circumferential surface of said wheel mounting portion.

12. The wheel mounting apparatus of claim 1, wherein said wheel mounting portion includes through-holes, the wheel mounting apparatus further comprising wheel bolts to be inserted into said through-holes.

13. The wheel mounting apparatus of claim 12, wherein each of said through-holes includes an oblique edge on at least one side of said through-hole.

14. The wheel mounting apparatus of claim 12, wherein each of said wheel bolts includes a bolt head having a flattened circumferential portion, said wheel mounting portion including a collar for contacting said flattened circumferential portion of said bolt head of each of said wheel bolts to prevent rotation of each of said wheel bolts.

15. The wheel mounting apparatus of claim 14, wherein each of said through-holes includes an oblique edge on at least one side of said through-hole.

16. The wheel mounting apparatus of claim 1, further comprising a wheel hub connected to said hub mounting portion.

17. A wheel mounting apparatus comprising:
    a wheel hub having a wheel hub body;
    a wheel hub flange including a wheel mounting portion to be connected to a wheel, and including a connecting portion integrally connected to said wheel hub body, said connecting portion having ventilation passages formed therein; and
    a brake disk integrally connected to said wheel hub body and spaced apart from said wheel mounting portion in an axial direction of the wheel mounting apparatus.

18. The wheel mounting apparatus of claim 17, wherein said ventilation passages are formed by spoke-shaped connection webs between said ventilation passages and extending in a radial direction of said wheel mounting portion.

19. The wheel mounting apparatus of claim 18, wherein each of said connection webs has a cross-sectional shape having an outer side thickness smaller than an inner side thickness, wherein said inner side and said outer side are defined relative to an axial direction of the wheel mounting apparatus.

20. The wheel mounting apparatus of claim 18, wherein each of said connection webs has an arc-shaped cross-section.

21. The wheel mounting apparatus of claim 20, wherein each of said connection webs has an outer side extending in a direction of rotation of the wheel when a vehicle attached to the wheel is traveling in a forward direction, said outer side being defined relative to an axial direction of the wheel mounting apparatus.

22. The wheel mounting apparatus of claim 17, wherein each of said ventilation passages is formed as an oblong hole having a major axis arranged in a circumferential direction of said wheel mounting portion.

23. The wheel mounting apparatus of claim 17, wherein said ventilation passages are evenly distributed around said wheel mounting portion on at least one pitch circle formed with respect to a center of rotation of said wheel hub flange.

24. The wheel mounting apparatus of claim 17, wherein said wheel mounting portion is provided in a first geometric plane, and said wheel hub body is provided in a second geometric plane, said first plane being offset from said second plane with respect to an axial direction of the wheel mounting apparatus, said connecting portion of said wheel hub flange comprising an oblique connecting portion.

25. The wheel mounting apparatus of claim 17, wherein said ventilation passages in said connecting portion of said wheel hub flange comprise a first group of ventilation passages, said wheel mounting portion including a second group of ventilation passages near an outer periphery of said wheel mounting portion.

26. The wheel mounting apparatus of claim 25, wherein said second group of ventilation passages comprises oblong holes having major axes arranged in a circumferential direction of said wheel mounting portion.

27. The wheel mounting apparatus of claim 25, wherein said second group of ventilation passages comprises recesses in a circumferential surface of said wheel mounting portion.

28. The wheel mounting apparatus of claim 17, wherein said wheel mounting portion includes through-holes, the wheel mounting apparatus further comprising wheel bolts to be inserted into said through-holes.

29. The wheel mounting apparatus of claim 28, wherein each of said through-holes includes an oblique edge on at least one side of said through-hole.

30. The wheel mounting apparatus of claim 28, wherein each of said wheel bolts includes a bolt head having a flattened circumferential portion, said wheel mounting portion including a collar for contacting said flattened circumferential portion of said bolt head of each of said wheel bolts to prevent rotation of each of said wheel bolts.

31. The wheel mounting apparatus of claim 30, wherein each of said through-holes includes an oblique edge on at least one side of said through-hole.

32. The wheel mounting apparatus of claim 17, wherein said wheel hub flange further includes a hub mounting portion connected to said wheel hub body.

* * * * *